United States Patent [19]
Suzuki et al.

[11] Patent Number: 5,815,332
[45] Date of Patent: Sep. 29, 1998

[54] RECORDING MEDIUM HAVING IMPROVED SERVO COMPENSATION AND METHOD FOR SAME

[75] Inventors: Hiroaki Suzuki, Fujisawa; Kenji Ogasawara, Kanagawa-ken; Masaharu Kawamura, Zama; Koji Kurachi, Yokohama, all of Japan

[73] Assignee: International Business Machines Coporation, Armonk, N.Y.

[21] Appl. No.: 623,943

[22] Filed: Mar. 29, 1996

[30] Foreign Application Priority Data

Mar. 31, 1995 [JP] Japan ..................................... 7-075149

[51] Int. Cl.⁶ ...................................................... G11B 5/09
[52] U.S. Cl. ........................ 360/48; 360/77.08; 360/78.14
[58] Field of Search ................................... 360/48, 51, 53, 360/77.08, 78.14

[56] References Cited

U.S. PATENT DOCUMENTS

4,912,576  3/1990  Janz ...................................... 360/77.07
5,027,234  6/1991  Kawahara ............................. 360/77.08
5,073,833  12/1991  Best et al. ......................... 360/77.08 X
5,073,834  12/1991  Best et al. ............................ 360/77.08
5,689,384  11/1997  Albrecht et al. ...................... 360/77.12

*Primary Examiner*—Andrew L. Sniezek
*Attorney, Agent, or Firm*—Shawn B. Dempster; David W. Lynch

[57] ABSTRACT

A mechanism for compensating the servo data in a disk storage drive is provided. On each recording surface of a disk, a plurality of servo regions are diametrally formed in data regions along the diametral direction of the disk. In the servo region, a gray code (cyclic binary code) representing the address of a data track is recorded so as to correspond to the data track, and a burst pattern as a signal for positioning the head on the track are recorded. In the data track region, tracks are formed at a predetermined pitch P and in the tracks, a plurality of data is recorded. ID (Identification) is the identification information of the individual data. A servo compensation signal region is formed at a position sandwiched by the data region and the servo region known as the write recovery area. This is to compensate the servo signal in the servo region, thereby to enable error recovery when a read error or the like occurs in the servo region.

5 Claims, 8 Drawing Sheets

RECORDING MEDIUM HAVING IMPROVED SERVO COMPENSATION AND METHOD FOR SAME

FIELD OF THE INVENTION

The present invention is related to an information recording medium, a method for identifying a head position, and an information recording and reading system, and particularly to an information recording medium on which identification information for detecting the position of a head on a disk is stored, a method for identifying the head position on the disk by using the identification information, and an information recording and reading system comprising them.

BACKGROUND OF THE INVENTION

On a magnetic disk such as a hard disk or flexible disk, data tracks are concentrically formed. Reading or writing information from or to the magnetic disk is performed after rotating the magnetic disk and moving the magnetic head substantially along the diametral direction of the magnetic disk to position the magnetic head on a predetermined data track (a so-called seek operation). To position the magnetic head on a predetermined data track, the head position identification information and burst pattern previously recorded on the magnetic disk are respectively read by the magnetic head.

Figure 5:
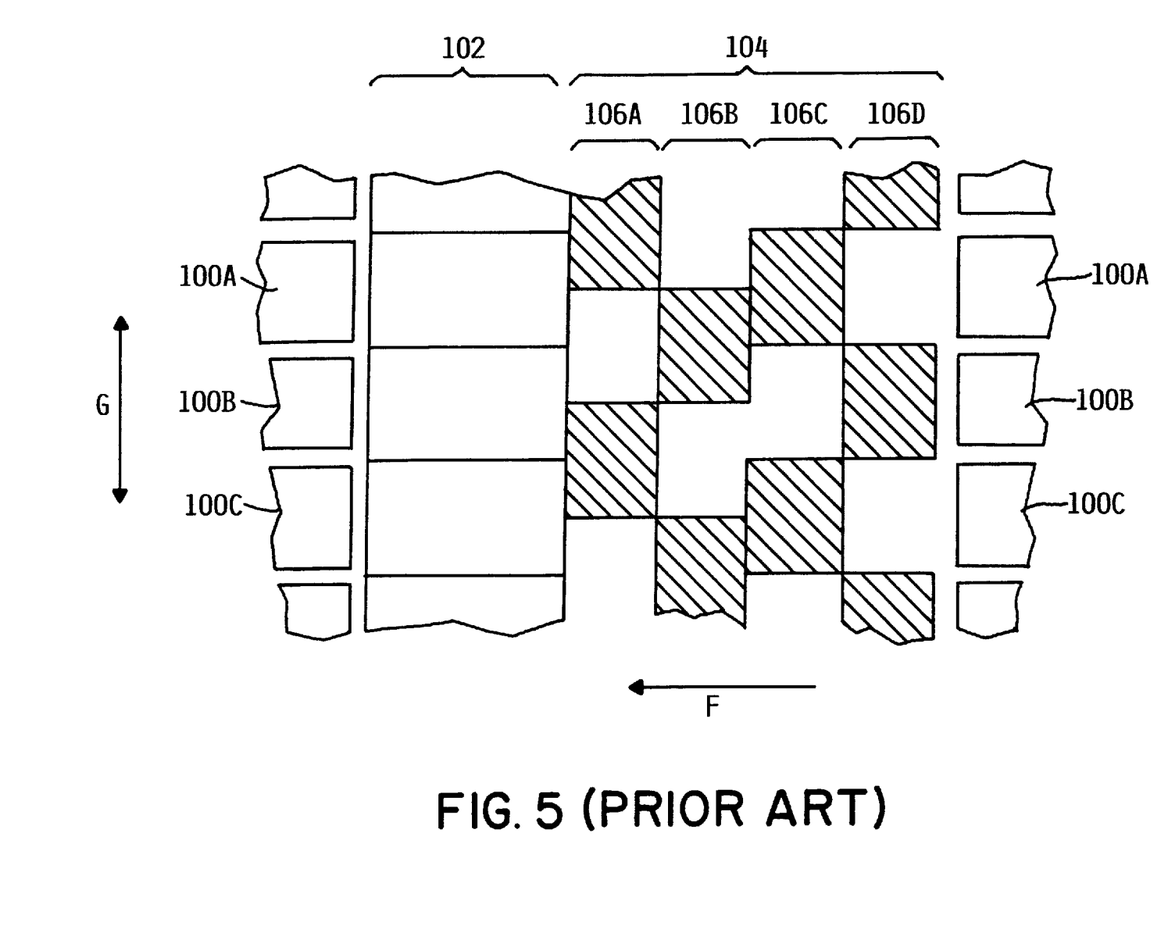
FIG. 5 shows an identification information recording region recorded on the information recording medium of the preferred embodiment.

FIG. 5 shows part of the head position identification information and burst pattern which are typically recorded on the magnetic disk. In FIG. 5, the magnetic disk rotates along the circumferential direction thereof (in the direction of an arrow F in FIG. 5), and the magnetic head, not shown, moves substantially along the diametral direction of the magnetic disk (the direction of arrow G in FIG. 5). On the magnetic disk, a plurality of data tracks 100A, 100B, and 100C, on which data is to be recorded are concentrically formed. Each data track is segmented along the circumferential direction, and between the data track segments, an identification information recording region 102 and a burst pattern recording region 104 are formed.

To each data track, a track address for identifying each data track is given, and in the identification information recording region 102, identification information of a predetermined number of bits respectively representing the track address by a gray code (cyclic binary code) is recorded along the circumferential direction so as to correspond to each data track. Further, in the burst pattern region 104, a plurality of (in FIG. 5, four) burst pattern trains 106A, 106B, 106C and 106D are recorded, in which each area has a signal recorded therein (in FIG. 5, shown by hatching) are disposed along the diametral direction.

To position the magnetic head on a predetermined data track, the magnetic disk is rotated and the magnetic head is moved substantially along the diametral direction of the magnetic disk, as described above, and each time the identification information recording region 102 is caused to correspond to the magnetic head by the rotation of the magnetic disk, the track address of the data track to which the magnetic head is corresponding is calculated as the current magnetic head position, on the basis of the identification information read signal which is outputted from the magnetic head. In the identification information, as more specifically shown in FIG. 6, part (A), the record length for data of one bit (L in FIG. 6, part (A) is predetermined, and the recording is made so that the positions to be magnetized to North (N) or South (S) in the recording range of the length L corresponding to each bit differ depending on the value of each bit in the gray code representing a track address is "0" or "1".

Figure 6A:
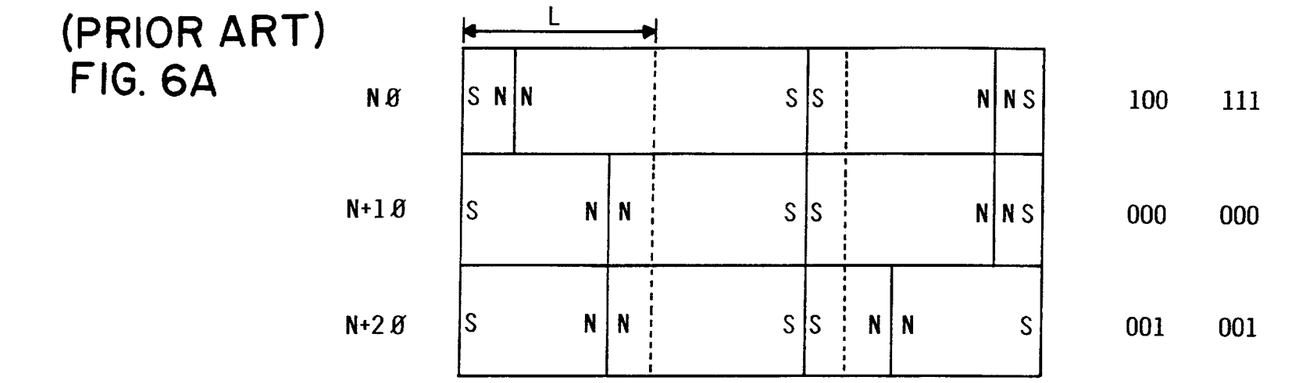
FIG. 6 details the usage of gray codes on an information recording medium.
Figure 6B:
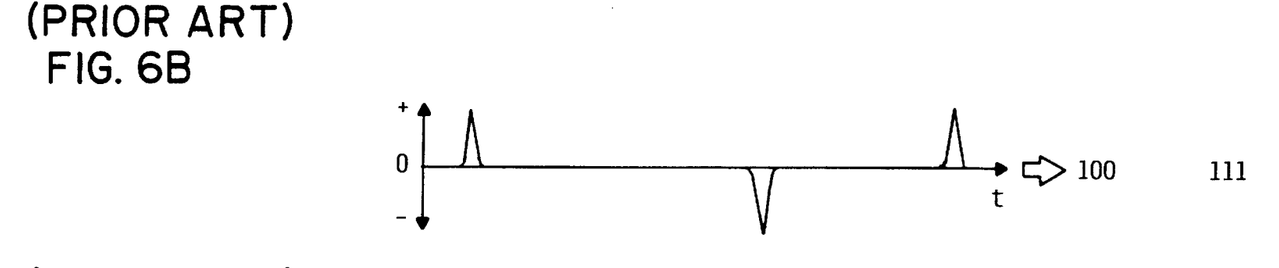
Figure 6C:
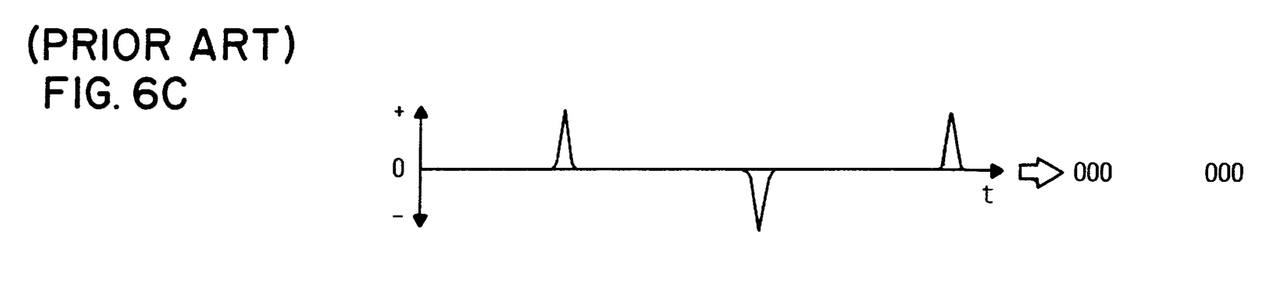

For instance, when the magnetic head passes the identification information recording region 102A of a data track N shown in FIG. 6, part (A), pulses are produced at portions magnetized to N or S as an identification information read signal, as shown in FIG. 6, part (B), and a signal corresponding to the pulses is outputted from the magnetic head. In addition, when the magnetic head passes the identification information recording region 102B of a data track N+1 shown in FIG. 6, part (A), pulses are produced at portions magnetized to N or S as an identification information read signal, as shown in FIG. 6, part (C), and a signal corresponding to the pulses is outputted from the magnetic head. Based on the positions of the pulses of the identification information read signals, the value of the gray code as the identification information recorded in the identification information recording region 102 can be determined, and a track address can be obtained by converting the determined gray code to a binary code.

A gray code (100) is read from the pulses of FIG. 6, part (B) and a converted binary code (111) is obtained, and a gray code (000) is read from FIG. 6, part (C) and a converted binary code (000) is obtained.

If it is determined that the magnetic head has corresponded to a target data track, a position detection signal having a level changing according to the magnetic head position is generated on the basis of a plurality of signals obtained by respectively reading the plurality of burst pattern trains in the burst pattern recording region 104 by means of the magnetic head, and based on the position detection signal, the magnetic head is positioned so that the gap of the magnetic head is positioned accurately within the width of the target data track.

As to the magnetic disk, many countermeasures against the defect of the medium, electrical noise, and read error have been taken as the storage capacity has been increasing. Usually, errors occurring in the data region are recovered by adding a signal having an error correction function such as an ECC (Error Correction Code). However, the countermeasures against errors in the servo region are insufficient. In addition, the overhead which is information other than user data increases if the ECC is also added not only to ordinary data but also to the servo region, which is disadvantageous to the realization of a high capacity storage ratio. In addition, it is also possible to take an anti-error measure in which the servo region is extended and servo information is continuously doubly written, but this measure also has a disadvantage that it increases overhead and cannot be an effective error recovery function for errors occurring in contiguous areas.

Therefore, a need exists for a servo signal construction which prevents the reproduction error of servo information to obtain accurate servo information. Also, a need exists for an information recording system in which servo compensation data for the head position information is written on a disk to give redundancy for a servo signal, whereby accurate servo information can be read. In addition, a need exists for an information recording system in which servo compensation data for the head position information is written in a region provided for the write recovery time of a disk, thereby for enabling redundancy to be given to a servo signal without affecting the data regions or the like.

The present invention provides a solution to these and other problems, and offers other advantages over the prior art.

SUMMARY OF THE INVENTION

In accordance with one embodiment of the invention, data regions of a information recording medium having data recorded therein and servo regions having head position information recorded therein are separately formed along the track direction of a disk. Between the data region and the servo region, a write recovery area for ensuring the time for changing from a write mode to a read mode is provided. In the write recovery area, a servo compensation signal for compensating at least part of the servo information recorded in the servo region is provided. The reading of the servo compensation signal enables the recovery from errors which occur in the servo signal of the original servo region.

For example, a gray code, which is a signal for coarse adjustment of the head position identification, may also be written in a write recovery area as a servo compensation signal as well as in the ordinary servo region which gives a duplicate of the gray code recorded in the servo region such that recovery from the read error from the gray code is enabled.

A second gray code is formed in the write recovery area provided after the data and ECC area, and before the ordinary servo region. The write recovery area is provided for ensuring the adjustment time for changing from the write mode to the read mode, as described above. The adjustment of a read amplifier and automatic gain control (AGC) is performed while the head is passing this area, thereby to set a normal read condition.

The first gray code is recorded at a position following an erase region which is a silent signal interval functioning as a servo ID (Identification) for showing the start position of servo information, and has the cylinder (CYL) and sector (SEC) position information at the current track position. Subsequently to the gray code, there is recorded a servo wedge formed of a burst pattern for providing a fine adjustment signal for the track at the head position.

The second gray code preferably has a construction similar to the first gray code, and also can be used in error recovery when a read error occurs.

In a mechanism having the servo compensation signal described in accordance with one embodiment of the present invention, even if an error occurs in the first servo signal, the recovery is enabled by the servo compensation signal, thereby increasing the reliability of the head position control.

The servo compensation signal described above preferably is written in the write recovery area, and it does not invade the original data region or servo region, so that the data density is not decreased. The servo compensation signal lying immediately after the data region is directly read when the head is in the read mode, and thereafter the original servo signal is subsequently read.

Further, if the head is in the write mode when it is in the data region, the mode is changed to the read mode in the servo compensation signal region and the servo signal in the ordinary servo region is read, and if a read error occurs at this point, then the disk rotation is waited and the reading of the servo compensation signal is performed when the head passes the servo compensation signal region, thereby obtaining a predetermined servo signal.

If the gray code which is a coarse adjustment signal for controlling the head position is written in the write recovery area as the above servo compensation signal, then the recovery is possible in the second gray code written in the servo compensation signal region even if an error occurs in the first gray code written in the ordinary servo region, whereby the reliability of the head position control is enhanced.

For an error occurring in continuous bits, such as an error due to the sticking of dust particles on the disk, the recovery is difficult to perform using the conventional error correction method such as the ECC, but in the construction in which the first and second gray codes are independently disposed so as to be spaced apart from each other, as in the above described embodiment of present invention, the possibility that the two produce duplicate errors due to a similar cause is extremely low, so that a good error recovery rate can be provided.

These and various other features as well as advantages which characterize the present invention will be apparent upon reading of the following detailed description and review of the associated drawings.

DETAILED DESCRIPTION

Figure 1:
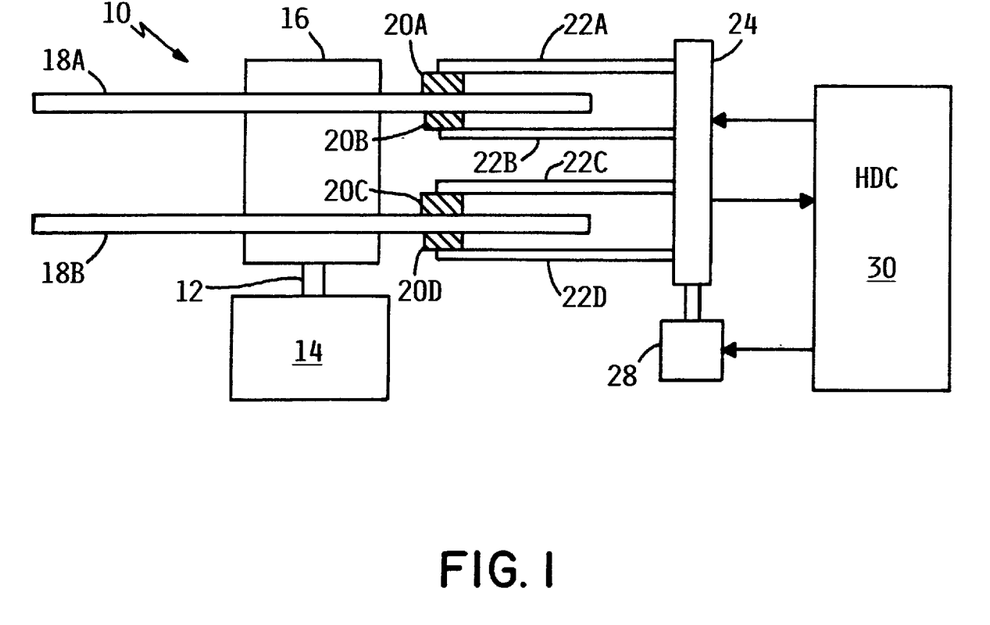
FIG. 1 is a block diagram of a magnetic disk storage drive in accordance with a preferred embodiment of the present invention.

As shown in FIG. 1, an HDD unit 10 has disks 18 and a hard disk controller (hereinafter referred to as HDC) 30.

The disk part has a disk drive device 14 for rotating a shaft 12 at a high speed. To the shaft 12, a cylindrical support 16 is attached so that the their axes are in coincidence, and between support 16, one or more information recording disks 18A and 18B are mounted. Magnetic heads 20A, 20B, and 20D are respectively provided to face the disk surface, and these magnetic heads are supported from an actuator 24 by access arms 22A, 22B, 22C, and 22D, respectively. The individual magnetic heads 20A to 20D receive the drive force transmitted from an actuator drive device 28 by a shaft 26 and rotates about the shaft 26 as the axis of rotation, and moved on the disk 18 to a predetermined position.

Figure 2:
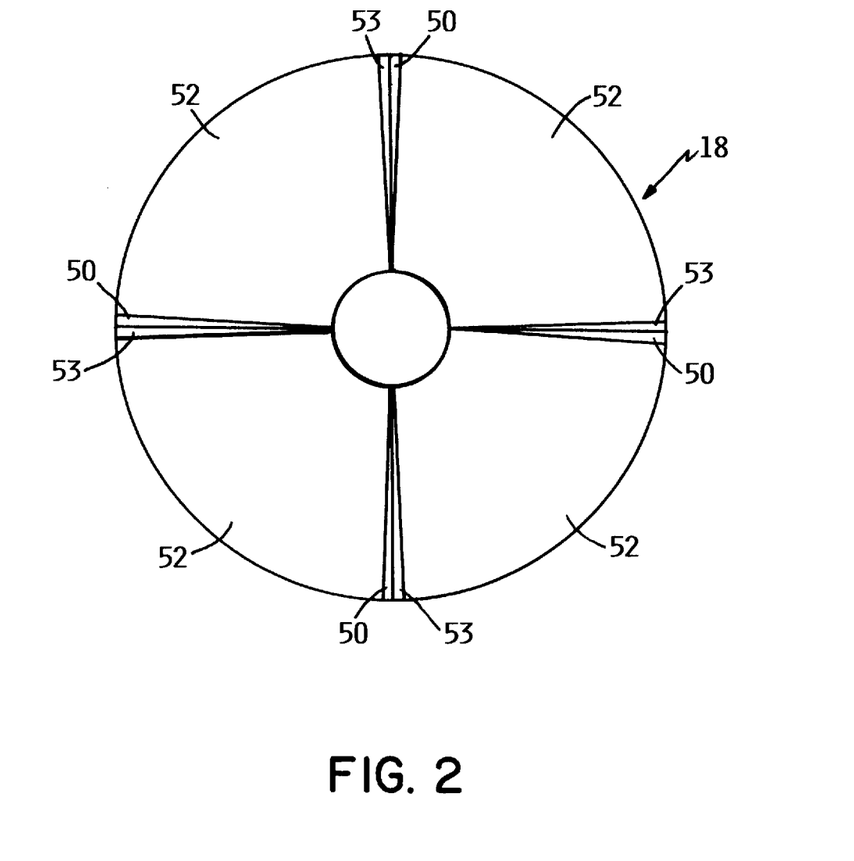
FIG. 2 shows a signal configuration of an information recording medium of the preferred embodiment.

On each recording surface of the disks 18A and 18B, data regions 52 are formed as shown in FIG. 2, and a plurality of servo regions 50 is diametrically formed in these data regions. In the servo regions 50, gray codes (cyclic binary codes) representing the addresses of data tracks are recorded so as to correspond to the data tracks, and burst patterns as signals for positioning the head on the tracks are recorded. In the data track regions 52, the tracks are formed at a predetermined pitch P.

In FIG. 2, a servo compensation signal region 53 is formed at a position sandwiched between the data region 52 and the servo region 50. This is to compensate the servo signal in the servo region to allow error recovery when a read error occurs in the servo region, as detailed later.

Figure 7:
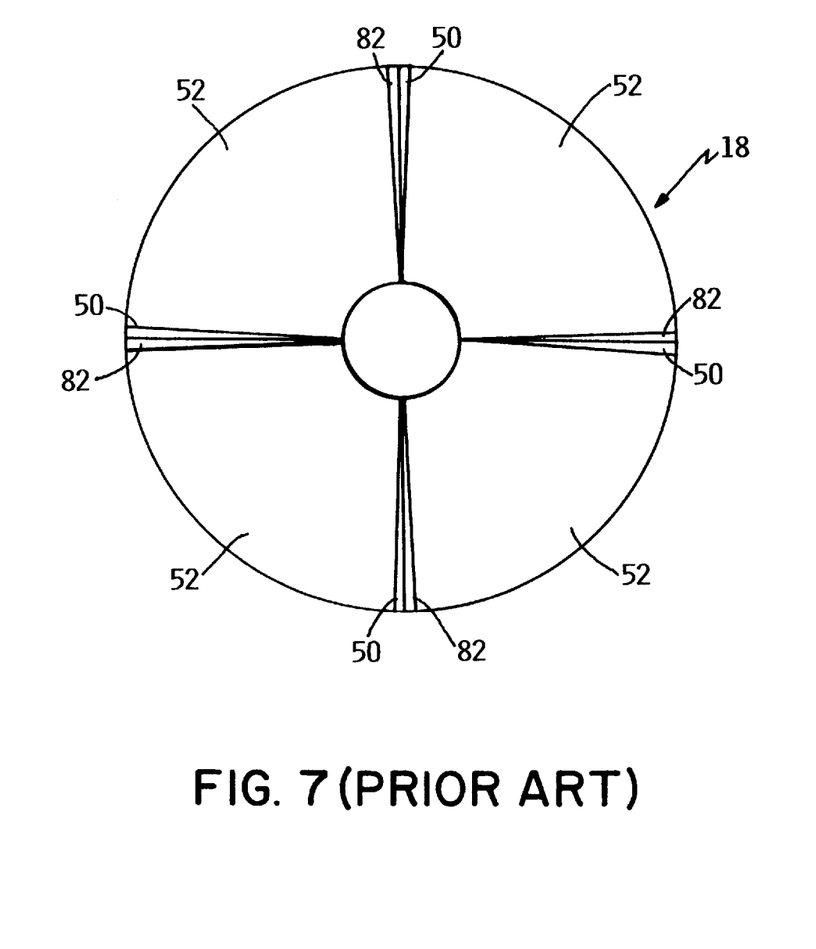
FIG. 7 shows a signal configuration of a conventional information recording medium.

On the recording surface of a conventional disk 18 shown in FIG. 7, data regions 52 are formed and a plurality of servo regions 50 are diametrally formed. Between the data region 52 and the servo region 50, a write recovery area 82 is formed. This is an area provided for ensuring the adjustment and control time for AGC and a read amplifier, which is required when the system mode is changed from the write mode to the read mode for the next data in the data region 52. The mode needs to be changed to the read mode till the servo region 50 positioned before the next data is reached. A sine wave or the like is often written in this area. This is not an area for which a reading is particularly performed, and no writing of effective data is executed.

Figure 8:
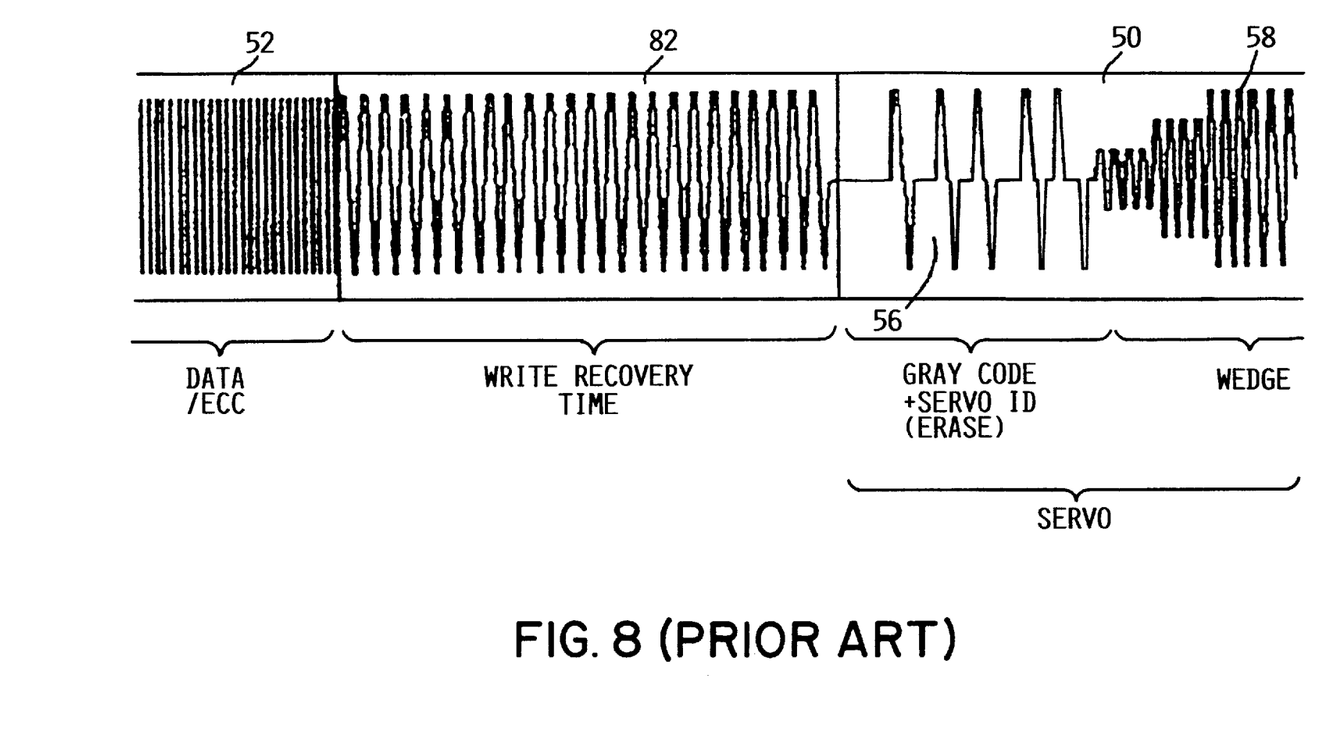
FIG. 8 shows a track signal configuration of a conventional information recording medium.

FIG. 8 is shows the conventional track signal construction. The main structural elements are data regions 52 and servo regions 50, and in the servo regions 50, there are recorded a gray code 56 for coarsely adjusting the head position, and a servo wedge signal 58 formed of a burst pattern for finely adjusting the head position. The data region has a signal for data error recovery such as ECC. Between the data region 52 and the servo region 50, a write recovery area 82 is formed. This is an area for ensuring the adjustment and control time for AGC and a read amplifier when the system mode is changed from the write mode in the data region 52 to the read mode before the next servo region 50 is reached, and a sine wave or the like is written in this area.

Figure 3:
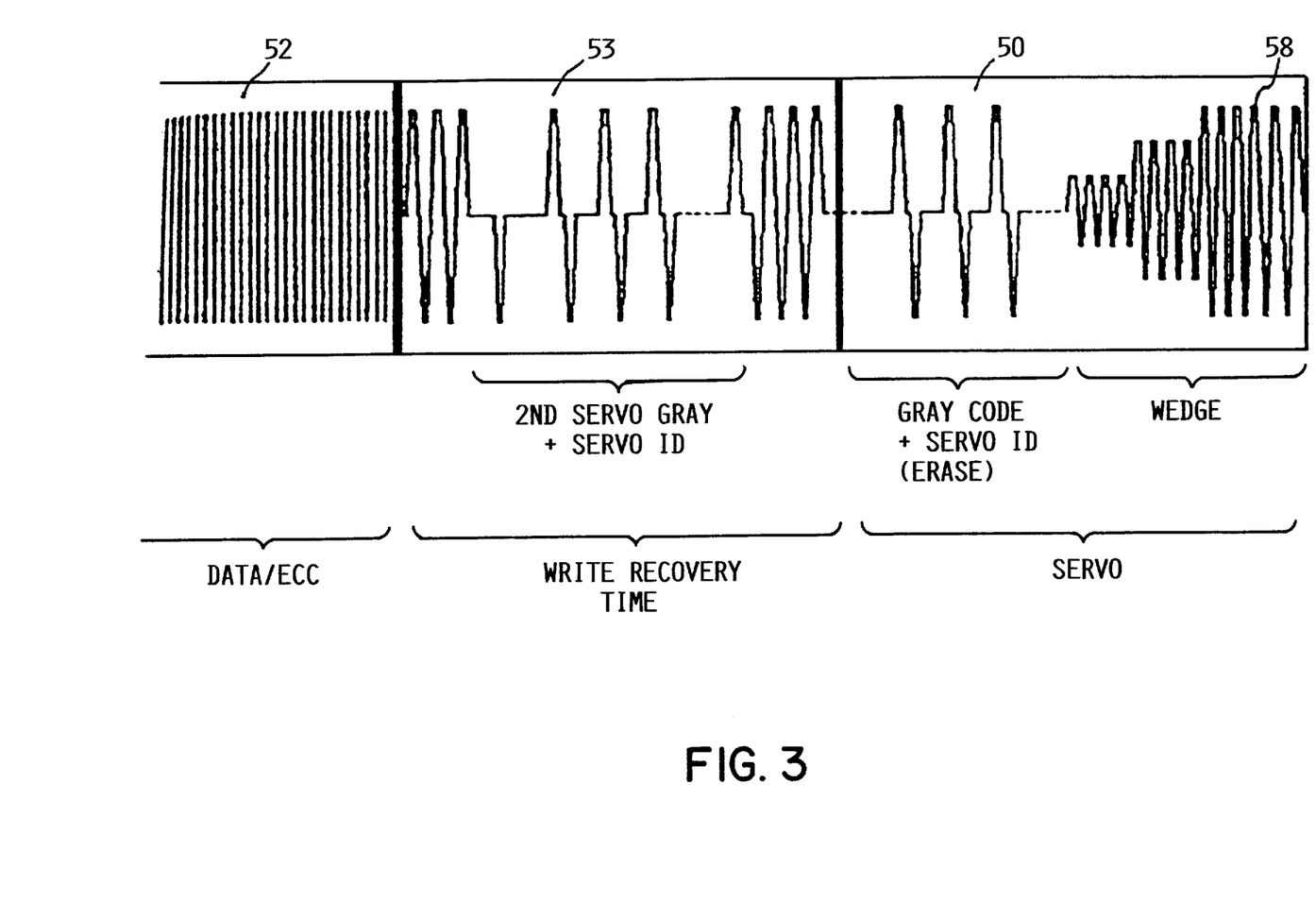
FIG. 3 shows a track signal configuration of the information recording medium of the preferred embodiment.

In FIG. 3, the signal construction in the tracks of the information recording medium of a preferred embodiment is shown. In FIG. 3, the data region 52 and the servo region 50 have constructions similar to the conventional ones. However, between the data region 52 and the servo region 50, a servo compensation signal region 53 is provided. This area is the area which has conventionally been used as a write recovery area. In the servo compensation signal region 53, a signal for compensating at least part of the servo signal written in the original servo region 50, thereby to allow error recovery when a servo signal read error occurs.

Figure 4:
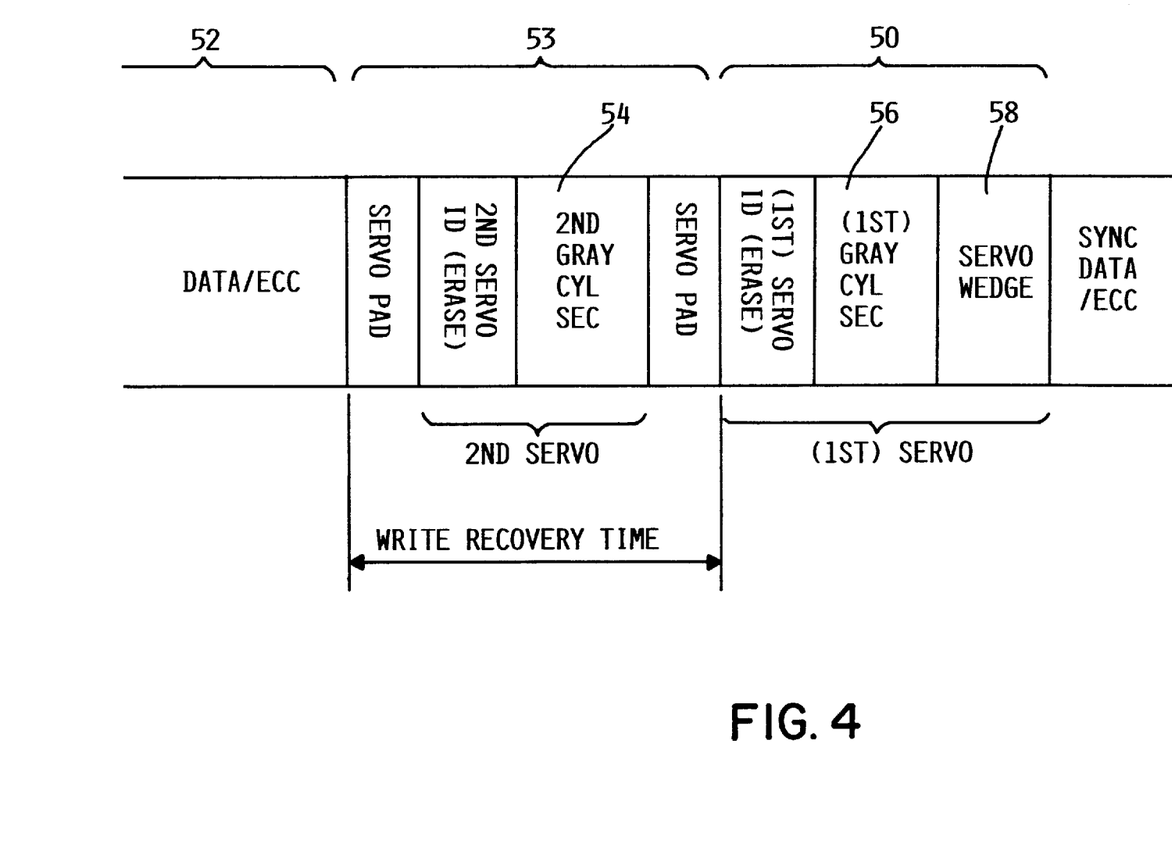
FIG. 4 shows a construction of a servo compensation signal of the information recording medium of the preferred embodiment.

FIG. 4 shows an embodiment of the signal construction in the tracks of the information recording medium of a preferred embodiment. In the servo compensation data region 53 between the data region 52 and the servo region 50, a gray code 54 used as a signal for coarsely adjusting the head position is written. A first gray code 56 is also written in the original servo region 50, and if a read error occurs in the first gray code 56, the recovery is enabled by reading the second gray code 54. Conversely, the second gray code can also be recovered by the first gray code.

The construction of each signal in FIG. 4 is detailed. Following the data region 52 consisting of data and an ECC (Error Correction Code) for correcting a data error, the servo compensation region 53 and the first servo region 50 are formed. After the first servo region, the next data is recorded subsequently to a SYNC (synchronizing) signal for generating a clock.

The first servo region 50 is similar to the conventional servo region, and has a servo ID formed of, for instance, an erase signal, for showing the servo start position. Following the servo ID, the first gray code region 56 is formed. In the gray code region 56, CYL representing a cylinder number and SEC representing a sector number are recorded by a gray code. Following the first gray code region 56, the servo wedge 58 formed of a burst pattern or the like for performing a fine adjustment of the head for tracks is recorded.

The servo compensation region 53 is positioned before the first servo region 50, and is recorded in the portion which has conventionally been used as a write recovery region and no effective signal has been recorded therein. The servo compensation region 53 has the following construction. First, following a servo pad for ensuring the interval for determining the gain of AGC, a second ID representing the start of the servo region is recorded. The servo ID is followed by the second gray code 54. In the second gray code, similarly to the first gray code region 56 in the original servo region 50, information on the cylinder number and the sector number is recorded by a gray code. Following the second gray code, a servo pad region is formed for ensuring a predetermined time t.

Now, description is made to a method for identifying a head position which uses an information recording medium in which a servo compensation signal is actually written. If the head is in the read mode when it is in the data region 52, it reads both or either the servo compensation signal in the servo compensation signal region 53 following the data region 52. Or the original servo signal in the subsequent servo region 50. If an error occurs in one of the signals doubly written in the servo compensation signal region 53 and the servo region 50, either of the regions supplies a normal servo signal to avoid the occurrence of the error.

If a read error occurs in the gray code 56 in the first servo region 50, the disk rotation is further waited and the second gray code 54 is read when the head is positioned on the servo compensation signal region 53, thereby to attempt the recovery from the error which has occurred in the first gray code. According to the cylinder (CYL) and sector (SEC) information obtained in the servo compensation signal region, a predetermined data processing is performed. In addition, the fine adjustment of the track position is carried out by the servo wedge 58 in the first servo region 50.

In the preferred embodiment of the present invention, part of the servo signal in the servo region is formed as a servo compensation signal in a different position on the disk, as described above. As a result, it is effective particularly for errors which were difficult to be recovered by a typical error correction method such as ECC (e.g., errors in continuous regions which are due to the deposition of foreign objects on the disk or flaws).

As described above, in accordance with an embodiment of the present invention, a compensation signal can be provided to the servo signal without using the data region or the ordinary servo region, whereby a more reliable servo operation is obtained.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. An information recording disk having data tracks concentrically formed thereon, comprising;
   (a) data regions having data recorded therein;
   (b) servo regions, separately formed from the data regions along the track direction of the disk, having head position information recorded therein; and
   (c) a write recovery area for ensuring a time delay needed for changing from a write mode to a read mode is provided between said data region and said servo region, the write recovery area being configured to record a servo compensation signal for compensating part of the servo information recorded in said servo region.

2. A system for storing data on an information recording medium comprising:
   (a) a disk drive device adapted for rotating the information recording medium;
   (b) an actuator; and
   (c) a magnetic head such that the magnetic head is operatively configured to read signals recorded on said data tracks, the information recording medium comprising:
      (i) data regions having data recorded therein:
      (ii) servo regions, separately formed from the data regions along the track direction of the disk, having head position information recorded therein, and
      (iii) a write recovery area for ensuring a time delay needed for changing from a write mode to a read mode is provided between said data region and said servo region, the write recovery area being configured to record a servo compensation signal for compensating part of the servo information recorded in said servo region.

3. In a system for storing data on an information recording medium having data tracks concentrically formed thereon, the information recording medium including: (a) data regions having data recorded therein, (b) servo regions, separately formed from the data regions along the track direction of the disk, having head position information recorded therein, and (c) a write recovery area for ensuring a time delay needed for changing from a write mode to a read mode is provided between said data region and said servo region, the write recovery area being configured to record a servo compensation signal for compensating part of the servo information recorded in said servo region, a method for identifying a head position which includes a step of:
   identifying said head position by reading a signal of the servo compensation signal in said write recovery area, if an error occurs in the servo signal at least in said servo region.

4. An information recording system, comprising:
   (a) a head for reading signals recorded on data tracks on a disk;
   (b) head moving means for allowing said head to access a predetermined data track; and
   (c) said disk, operatively configured for rotation by a rotation mechanism, having the data tracks concentrically formed thereon, said disk comprising: (i) data regions having data recorded therein, (ii) servo regions, separately formed from the data regions along the track direction of the disk, having head position information recorded therein, and (iii) a write recovery area for ensuring a time delay needed for changing from a write mode to a read mode is provided between said data region and said servo region, the write recovery area used to record a servo compensation signal for compensating part of the servo information recorded in said servo region.

5. The information recording system of claim 4 wherein said servo compensation signal has a gray code for coarse head position adjustment recorded in said write recovery area.

* * * * *